US008879482B2

(12) United States Patent
Cho et al.

(10) Patent No.: US 8,879,482 B2
(45) Date of Patent: Nov. 4, 2014

(54) METHOD ALLOWING RANGING DEPENDENT ON STATUS OF MOBILE STATION IN BROADBAND WIRELESS ACCESS SYSTEM

(75) Inventors: Hee Jeong Cho, Anyang-si (KR); In Uk Jung, Anyang-si (KR); Gi Won Park, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 13/203,662

(22) PCT Filed: Feb. 26, 2010

(86) PCT No.: PCT/KR2010/001245
§ 371 (c)(1),
(2), (4) Date: Nov. 9, 2011

(87) PCT Pub. No.: WO2010/098626
PCT Pub. Date: Sep. 2, 2010

(65) Prior Publication Data
US 2012/0051300 A1 Mar. 1, 2012

Related U.S. Application Data

(60) Provisional application No. 61/155,525, filed on Feb. 26, 2009.

(30) Foreign Application Priority Data

Feb. 26, 2010 (KR) .................... 10-2010-0017757

(51) Int. Cl.
*H04W 72/04* (2009.01)
(52) U.S. Cl.
USPC ........................................ 370/329

(58) Field of Classification Search
CPC ...................................... H04W 72/04
USPC ................................................ 370/329
See application file for complete search history.

(56) References Cited

U.S. PATENT DOCUMENTS

| | | | |
|---|---|---|---|
| 2005/0058058 A1* | 3/2005 | Cho et al. ................. | 370/208 |
| 2006/0203712 A1 | 9/2006 | Lim et al. | |
| 2007/0104177 A1* | 5/2007 | Hwang et al. .............. | 370/348 |
| 2007/0258407 A1* | 11/2007 | Li et al. .................... | 370/331 |
| 2007/0274265 A1 | 11/2007 | Yoon et al. | |
| 2008/0182579 A1* | 7/2008 | Wang et al. ............... | 455/436 |

OTHER PUBLICATIONS

Zhang et al., "Enhanced initial ranging and BW request ranging," IEEE 802.16 Broadband Wireless Access Working Group, IEEE C802.16e-04/300r1, Aug. 2004.

* cited by examiner

*Primary Examiner* — Sulaiman Nooristany
(74) *Attorney, Agent, or Firm* — Lee, Hong, Degerman, Kang & Waimey

(57) ABSTRACT

The present system relates to a broadband wireless access system, and more specifically to a method whereby resources for ranging are efficiently allocated to a mobile station with reference to the status of the mobile station, and also relates to a device for implementing the same. In one example of the present invention, the method for allowing a mobile station to range on a broadband wireless access system may comprise the steps of: selecting any one code from one or more codes contained in a ranging code subset corresponding to the status of a mobile station in one or more ranging codes subsets set in accordance with the purpose of the ranging by the mobile station mode; and transmitting the selected code to a base station.

15 Claims, 3 Drawing Sheets

METHOD ALLOWING RANGING DEPENDENT ON STATUS OF MOBILE STATION IN BROADBAND WIRELESS ACCESS SYSTEM

CROSS-REFERENCE TO RELATED APPLICATIONS

This application is the National Stage filing under 35 U.S.C. 371 of International Application No. PCT/KR2010/001245, filed on Feb. 26, 2010, which claims the benefit of earlier filing date and right of priority to Korean Patent Application No. 10-2010-0017757, filed on Feb. 26, 2010, and also claims the benefit of U.S. Provisional Application Ser. No. 61/155,525, filed on Feb. 26, 2009.

TECHNICAL FIELD

The present invention relates to a broadband wireless access system, and more particularly to a method for allocating resources for efficient ranging to a mobile station in consideration of the status of the mobile station and an apparatus for performing the same.

BACKGROUND ART

Handover (HO) means that a mobile station moves from a radio interface of one base station to a radio interface of another base station. Hereinafter, a handover procedure in a general IEEE 802.16e system will be described.

In an IEEE 802.16e network, a serving base station (SBS) may broadcast neighboring base station information through a neighboring advertisement (MOB_NBR-ADV) message to notify a mobile station (MS) of information (topology) on basic network configuration.

The neighboring advertisement (MOB_NBR-ADV) message includes system information on a serving base station and neighboring base stations, for example, preamble index, frequency, handover (HO) optimization capability information and downlink channel descriptor (DCD)/uplink channel descriptor (UCD) information.

The DCD/UCD information includes information to be known by the mobile station to perform information, exchange through a downlink and an uplink. For example, examples of the information to be known by the mobile station include handover trigger information, medium access control (MAC) version of the base station, and media independent handover (MIH) capability information.

The general neighboring advertisement (MOB_NBR-ADV) message includes information only on neighboring base stations of the IEEE 802.16e type. Accordingly, neighboring base station information of another type except for the IEEE 802.16e type may be broadcasted to the mobile stations through a service identity information advertisement (SII-ADV) message. In this case, the mobile station may acquire information on heterogeneous network base stations by requesting the serving base station to transmit the SII-ADV message.

A handover procedure performed in the IEEE 802.16e network by the mobile station that has acquired neighboring base station information through the aforementioned method will be described in more detail.

The handover procedure in the general IEEE 802.16e network may include three procedures, i.e., a handover initiation & preparation procedure, a handover execution procedure and a handover completion procedure.

An example of the basic handover procedure as above will be described with reference to FIG. 1.

FIG. 1 is a diagram illustrating an example of a handover procedure that may be performed in the IEEE 802.16e system.

Referring to FIG. 1, the mobile station MS is registered with a serving base station SBS to transmit and receive data to and from the serving base station SBS (S101).

The serving base station SBS may periodically broadcast information on neighboring base stations existing within its coverage to mobile stations through a MOB_NBR-ADV message (S102).

The mobile station may start scanning for candidate handover base stations based on a handover (HO) trigger condition while performing communication with the serving base station. If a scanning value exceeds a handover condition, for example, predetermined hysteresis margin, the mobile station may transmit a handover request (MOB_MSHO-REQ) message to the serving base station to request the serving base station to perform the handover procedure (S103).

The serving base station that has received the handover request message may notify the candidate handover base stations included in the MOB_MSHO-REQ message, of handover request through a handover request (HO-REQ) message (S104).

For the mobile station, which has requested handover, the candidate handover base stations transfer handover related information to the serving base station through a handover response (HO-RSP) message (S105).

The serving base station transmits the handover related information acquired from the candidate handover base stations through the HO-RSP message to the mobile station through a handover response (MOB_BSHO-RSP) message. In this case, the MOB_BSHO-RSP message includes information required for handover, such as action time for performing handover, handover identifier (HO-ID), and a dedicated handover CDMA ranging code (S106).

The mobile station may select one target base station from the candidate handover base stations based on handover information included in the MOB_BSHO-RSP message received from the serving base station. As a result, the mobile station may try ranging by transmitting the CDMA code to the selected target base station (S107).

The target base station that has received the CDMA code may transmit success or failure of ranging and physical correction values to the mobile station through a ranging response (RNG-RSP) message (S108).

Next, the mobile station may transmit a ranging request (RNG-REQ) message for authentication to the target base station (S109).

The target base station that has received the ranging request message of the mobile station may provide system information, which may be used in the corresponding base station, such as connection identifier (CID), to the mobile station through a ranging response message (S110).

If the target base station transmits update information after successfully performing authentication of the mobile station, it may notify the serving base station of the mobile station of handover success or failure through a handover completion (HO-CMPT) message (S111).

Afterwards, the mobile station may transmit and receive information to and from the target base station that has performed handover (S112).

A handover procedure, which may be performed in the IEEE 802.16m system, is similar to the aforementioned handover procedure of the IEEE 802.16e system. However, titles of respective messages may be used differently as follows.

MOB_NBR-ADV→AAI_NBR-ADV: the corresponding message includes system information transmitted in a format of S-SFH not DCD/UCD.

MSHO-REG→AAI_HO-REQ

BSHO-RSP→AAI_HO-CMD

RNG-REQ (DCMA code)→Ranging preamble code

RNG-RSP (ranging status)→AAI_RNG-ACK (ranging status)

RNG-REQ (MAC message)→AAI_RNG-REQ

RNG-RSP→AAI_RNG-RSP: the corresponding message includes TSTID or STID, which is a station identifier, not CID.

Next, an idle mode will be described.

If the mobile station does not receive traffic from the base station for a certain time, it may be shifted to an idle mode for power saving. The mobile station shifted to the idle mode may receive a broadcast message (for example, paging message) from the base station for an available interval to determine whether it is to be shifted to a normal mode or maintained at the idle mode. Also, the mobile station in the idle mode may notify a paging controller of its location by performing location update.

The idle mode allows activity request related to handover and general operation requests to be removed, whereby the mobile station may be benefited. The idle mode may save power and operation resources used by the mobile station by restricting activities of the mobile station to perform scanning for a discrete period.

Also, the idle mode provides a simple and proper scheme that may notify the mobile station of pending downlink traffic, and removes a radio interface and network handover traffic from a mobile station of a non-active state, whereby the network and the base station may be benefited.

Paging means a function for identifying a location (for example, random base station or random relay station) of a corresponding mobile station when a call signal is generated in accordance with mobile communication. A plurality of base stations (BSs) that support an idle mode belong to a specific paging group to configure a paging region.

In order to increase a hit ratio of paging, the mobile station may perform a location update procedure. Location update is an operation of the mobile station, which is performed to increase a hit ratio during paging for the mobile station that has entered the idle mode, and means a process of reporting a new location or zone of the mobile station to the network when the mobile station moves to the new zone. This location update procedure may be performed by a method for exchanging a ranging request (RNG-REQ) message and a ranging response (RNG-RSP) message between the mobile station and the base station.

In the mean time, there exists a sleep mode, which is similar to the idle mode but does not return station identifier (basic CID in the IEEE 802.16e system and STID in the IEEE 802.16m system). A mobile station of an active state may shift to the sleep mode to minimize power consumption. If this mobile station moves to another base station (target base station), it performs a handover procedure including a handover ranging procedure that includes selecting any one of handover ranging code sets and transmitting the selected one to the base station.

Hereinafter, a deregistration with content retention mode (DCR mode) will be described.

The DCR mode means that a context of the mobile station is retained by a network entity for an effective period of a predetermined timer even though the mobile station is deregistered from the network. For the effective period of the predetermined timer, the network retains information required for quick network re-entry of the mobile station. When the mobile station enters the DCR mode, context retention identifier (CRID) is allocated to the mobile station. In order that the mobile station shifts from the DCR mode to the active mode, the mobile station may perform a ranging procedure by transmitting any one of handover ranging codes to the base station.

In the aforementioned procedures, the mobile stations having different states (active, sleep, idle, and DCR) from one another should transmit a ranging request (AAI_RNG-REQ) message to the corresponding base station to perform the ranging procedure for their respective purposes. In this case, each mobile station should be allocated with an uplink resource for transmitting the ranging request message from the corresponding base station. To this end, the mobile station first transmits a ranging code to the base station.

At this time, since the mobile station selects any one of same handover ranging code sets, the base station cannot identify a status of the mobile station that has transmitted the corresponding code and an intention of the mobile station. For this reason, the base station has to allocate an uplink resource of a fixed size to have the mobile station transmit a ranging request message. At this time, if the fixed size is smaller than a size required for transmission of parameters, the mobile station should additionally request the uplink resource to transmit the other parameters. By contrast, if the fixed size is greater than a size required for transmission of parameters, waste of resources waste occurs. Accordingly, the mobile station needs to efficiently notify the base station of its status while it is performing the ranging procedure.

DISCLOSURE

Technical Problem

The present invention has been devised to substantially obviate one or more problems due to limitations and disadvantages of the related art, and an object of the present invention is to provide a method for efficiently performing ranging in consideration of a status of a mobile station and an apparatus for performing the same.

Another object of the present invention is to provide a method for efficiently allocating resources for transmission of a ranging request message in consideration of a ranging purpose based on a status of a mobile station, and an apparatus for performing the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for allowing a mobile station to perform ranging in a broadband wireless access system comprises the steps of selecting any one code from one or more codes contained in a ranging code subset corresponding to the status of a mobile station in one or more ranging codes subsets set in accordance with the purpose of the ranging based on a mobile station mode; and transmitting the selected code to a base station.

In this case, the method may further comprise the step of receiving uplink resource allocation information corresponding to the ranging code subset including the transmitted code, from the base station.

Also, the method may further comprise the step of transmitting a ranging request (AAI_RNG-REQ) message to the base station by using an uplink resource indicated by the uplink resource allocation information.

Also, the ranging purpose based on the mobile station mode may include handover performed in an active mode or a sleep mode, network re-entry in an idle mode, location update in the idle mode, and network re-entry in a deregistration with context retention (DCR) mode.

Also, the handover and the network re-entry in the DCR mode may correspond to a first ranging code subset, and the network re-entry in the idle mode and the location update in the idle mode may correspond to a second ranging code subset.

Also, the method may further comprise the step of receiving configuration information on the one or more ranging code subsets from the base station through a broadcast channel.

Preferably, the one or more ranging code subset is included in a handover ranging code set, and the ranging corresponds to ranging of a contention based random access mode.

To solve the aforementioned technical problems, in another aspect of the present invention, a method for allowing a base station to perform ranging in a broadband wireless access system comprises the steps of receiving a handover ranging code from a mobile station; allocating an uplink resource to the mobile station, the uplink resource having a size corresponding to a ranging code subset including the received code from one or more ranging code subsets set in accordance with the purpose of the ranging based on a mobile station mode; and transmitting uplink resource allocation information indicating the allocated uplink resource to the mobile station.

In this case, the method may further comprise the step of transmitting a ranging request (AAI_RNG-REQ) message from the mobile station through the uplink resource.

Also, the ranging purpose based on the mobile station mode may include handover performed in an active mode or a sleep mode, network re-entry in an idle mode, location update in the idle mode, and network re-entry in a deregistration with context retention (DCR) mode.

Also, the handover and the network re-entry in the DCR mode may correspond to a first ranging code subset, and the network re-entry in the idle mode and the location update in the idle mode may correspond to a second ranging code subset.

Also, the method may further comprise the step of broadcasting configuration information on the one or more ranging code subsets through a broadcast channel.

Preferably, the one or more ranging code subset is included in a handover ranging code set, and the ranging corresponds to ranging of a contention based random access mode.

To solve the aforementioned technical problems, in other aspect of the present invention, a mobile station operated in a broadband wireless access system comprises a processor; and a radio frequency (RF) module transmitting and receiving a radio signal to and from the outside under the control of the processor, wherein the processor selects any one from one or more codes contained in a ranging code subset corresponding to the status of a mobile station in one or more ranging codes subsets set in accordance with the purpose of ranging based on a mobile station mode, and transmits the selected code to a base station by controlling the RF module.

In this case, if uplink resource allocation information corresponding to the ranging code subset including the transmitted code is received from the base station, the processor may transmit a ranging request (AAI_RNG-REQ) message to the base station by using an uplink resource indicated by the uplink resource allocation information.

Also, the ranging purpose based on the mobile station mode may include handover performed in an active mode or a sleep mode, network re-entry in an idle mode, location update in the idle mode, and network re-entry in a deregistration with context retention (DCR) mode.

Also, the handover and the network re-entry in the DCR mode may correspond to a first ranging code subset, and the network re-entry in the idle mode and the location update in the idle mode may correspond to a second ranging code subset.

Also, the processor may acquire configuration information on the one or more ranging code subsets from the base station through a broadcast channel.

Preferably, the one or more ranging code subset is included in a handover ranging code set, and the ranging corresponds to ranging of a contention based random access mode.

Advantageous Effects

According to the embodiments of the present invention, the following advantages can be obtained.

First of all, the mobile station can in advance notify the base station of a purpose of ranging in consideration of its status.

In addition, the base station which in advance identifies a purpose of ranging performed by the mobile station can efficiently allocate an uplink resource for transmission of a ranging request message to the mobile station.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
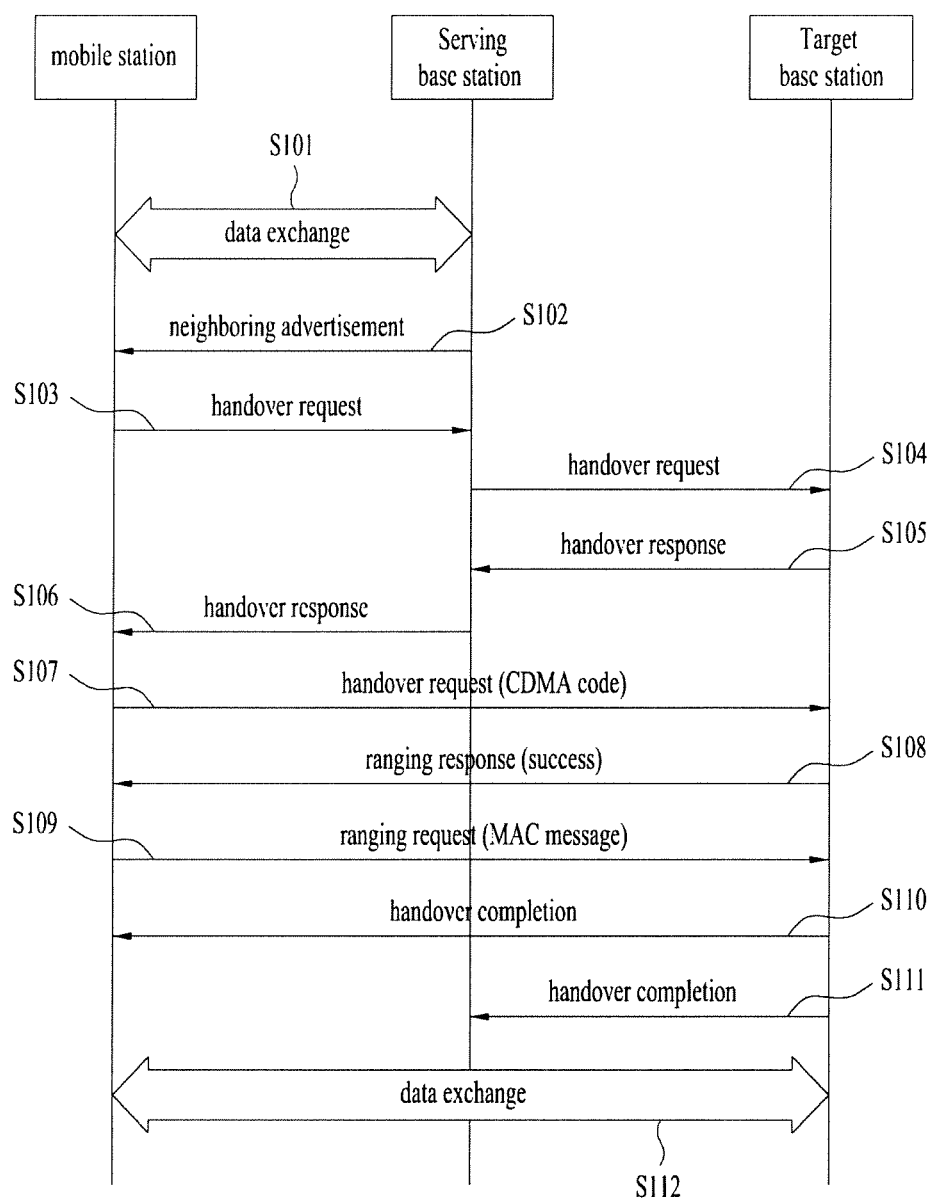
FIG. 1 is a diagram illustrating an example of a handover procedure that may be performed in an IEEE 802.16e system.

The present invention discloses a method for efficiently performing ranging and an apparatus for performing the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), an access point (AP), and an advanced base station (ABS). Also, the mobile station may be replaced with terms such as a terminal, a user equipment (UE), a mobile subscriber station (MSS), an advanced mobile station (AMS), and a subscriber station (SS).

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Specific terminologies hereinafter used in the embodiments of the present invention are provided to assist understanding of the present invention, and various modifications can be made in the specific terminologies within the range that they do not depart from technical spirits of the present invention.

Size of Ranging Request Message According to Status of Mobile Station

If the mobile station performs location in an idle mode or performs network initial entry or network re-entry through handover, it performs a ranging procedure. A purpose of the ranging procedure may be different depending on a status of the mobile station, whereby types of parameters included in a ranging request message may be varied. In other words, the mobile station transmits a ranging request (AAI_RNG-REQ) message, which includes parameters required depending on the status of the mobile station and the ranging purpose. Namely, the parameters included in the RNG-REQ message may be different from one another depending on the status of the mobile station and the ranging purpose.

For example, serving base station identifier (BSID) and previous station identifier (STID) are included in the ranging request message only when the mobile station of an active or sleep mode performs ranging and handover procedures. By contrast, paging controller ID, deregistration identifier (DID) for identifying the mobile station in the idle mode, paging group identifier (PGID), paging cycle, paging offset, paging cycle change and advanced mobile station mobility information are included in the ranging request message only when the mobile station of the idle mode performs the ranging procedure.

Hereinafter, the ranging request message transmitted from the mobile station to the base station to perform a handover or location update procedure will be described depending on the status of the mobile station.

First of all, network initial entry of the mobile station will be described.

Table 1 illustrates parameters included in the ranging request message transmitted from the mobile station to the base station during network initial entry.

TABLE 1

| Fields | Size (bit) |
| --- | --- |
| Management Message Type | 8 |
| CRC | 16 |
| AMSID* | 48 |
| MAC version | 8 |
| Total | 80 |

For conciseness, fields necessarily included in the corresponding message depending on the status of the mobile station are illustrated in Table 1 and other Tables below, and some fields generally included regardless of the purpose of ranging will be omitted.

Referring to Table 1, the ranging request message transmitted from the mobile station during initial network entry may include information of a total of 80 bits such as hashed MAC address value (AMSID*) and MAC version value of the mobile station.

Next, the ranging procedure performed by the mobile station of the active or sleep mode will be described.

The mobile station of the active mode may perform the ranging procedure during the handover procedure, and the mobile station of the sleep mode may perform the ranging procedure after shifting to the active mode. Accordingly, the ranging request messages transmitted from the mobile station in these two modes may be similar to each other.

Table 2 illustrates parameters included in the ranging request message transmitted from the mobile station of the active or sleep mode to the base station.

TABLE 2

| Fields | Size (bit) |
| --- | --- |
| Management Message Type | 8 |
| CRC | 16 |
| Ranging Purpose Indication | 8 |
| Serving BSID | 48 |
| STID | 12 |
| AK_COUNT | 16 |
| CMAC Tuple | 152 |
| Reserved | 4 |
| Total | 264 |

Referring to Table 2, the ranging request message transmitted from the mobile station of the active or sleep mode to the base station may include information of a total of 264 bits such as a ranging purpose indicator indicating a purpose of ranging performed through the corresponding message, serving base station identifier (BSID), station identifier (STID), authentication key count (AK_Count) and cipher based message authentication code (CMAC) tuple, wherein the authentication key count and the cipher based message authentication code tuple are security parameters.

Next, the ranging procedure performed by the mobile station of the idle mode to perform location update will be described.

Table 3 illustrates parameters included in the ranging request message transmitted from the mobile station of the idle mode to the base station when the mobile station performs location update.

TABLE 3

| Fields | Size (bit) |
| --- | --- |
| Management Message Type | 8 |
| CRC | 16 |
| Ranging Purpose Indication | 8 |
| Paging Controller ID | 48 |
| Deregistration Identifier (DID) | 10 |
| PGID | 16 |
| Paging Cycle | 4 |
| Paging Offset | 4 |
| Paging Cycle Change | 4 |
| Power Down Indicator | 1 |
| AK_COUNT | 16 |
| CMAC Tuple | 152 |
| AMS Mobility Information | 2 |
| Reserved | 7 |
| Total | 296 |

Referring to Table 3, the ranging request message transmitted from the mobile station of the idle mode to the base station to perform location update may include information of a total of 296 bits such as a ranging purpose indicator, paging controller ID, deregistration identifier (DID) for identifying the mobile station in the idle mode, paging group identifier (PGID), paging cycle, paging offset, paging cycle change, power down indicator, authentication key count, cipher based message authentication code (CMAC) tuple, and advanced mobile station mobility information.

Next, the ranging procedure performed by the mobile station of the idle mode to perform network re-entry will be described.

Table 4 illustrates parameters included in the ranging request message transmitted from the mobile station of the idle mode to the base station when the mobile station performs network re-entry.

TABLE 4

| Fields | Size (bit) |
| --- | --- |
| Management Message Type | 8 |
| CRC | 16 |
| Ranging Purpose Indication | 8 |
| Paging Controller ID | 48 |
| Deregistration Identifier (DID) | 10 |
| PGID | 16 |
| Paging Cycle | 4 |
| Paging Offset | 4 |
| AK_COUNT | 16 |
| CMAC Tuple | 152 |
| Reserved | 6 |
| Total | 288 |

Referring to Table 4, the ranging request message transmitted from the mobile station of the idle mode to the base station to perform network re-entry may include information of a total of 288 bits such as a ranging purpose indicator, paging controller ID, deregistration identifier (DID), paging group identifier (PGID), paging cycle, paging offset, authentication key count, and cipher based message authentication code (CMAC) tuple.

Next, the ranging procedure performed by the mobile station of a deregistration with content retention mode (DCR) mode to perform network re-entry will be described.

Table 5 illustrates parameters included in the ranging request message transmitted from the mobile station of the DCR mode to the base station when the mobile station performs network re-entry.

TABLE 5

| Fields | Size (bit) |
| --- | --- |
| Management Message Type | 8 |
| CRC | 16 |
| Ranging Purpose Indication | 8 |
| CRID | 48 |
| AK_COUNT | 16 |
| CMAC Tuple | 152 |
| Total | 248 |

Referring to Table 5, the ranging request message transmitted from the mobile station of the DCR mode to the base station to perform network re-entry may include information of a total of 248 bits such as a ranging purpose indicator, context retention identifier (CRID) for identifying the mobile station in a DCR mode, authentication key count, and cipher based message authentication code (CMAC) tuple.

However, when the ranging request message for each of the aforementioned modes is transmitted, a size of a radio resource may be varied depending on a level of a modulation and coding scheme (MCS). This will be described with reference to Table 6.

Table 6 illustrates a size of a resource unit (RU), which is occupied by the ranging request message according to the mode of the mobile station, depending on the level of the MCS.

TABLE 6

| MCS ($I_{sizeoffset}$) | Active/Sleep-handover | Idle - location update | Idle - network re-entry | DCR - network re-entry |
|---|---|---|---|---|
| 0 | 18 | 20 | 20 | 18 |
| 1 | 15 | 18 | 18 | 15 |
| 2 | 13 | 15 | 15 | 13 |
| 3 | 12 | 13 | 13 | 12 |
| 4 | 10 | 12 | 12 | 10 |
| 5 | 9 | 11 | 11 | 9 |
| 6 | 8 | 9 | 9 | 8 |
| 7 | 7 | 8 | 8 | 7 |

Referring to Table 6, a size of an uplink resource for transmitting the ranging request message is varied as much as 1RU to 3RU per mode depending on the level of the MCS.

As illustrated in Table 6, since the size of the resource required to transmit the ranging request message to the base station is varied depending on the status of the mobile station, the base station needs to know the status or the purpose of ranging to allocate a resource of a proper size depending on the status of the mobile station.

The mobile station may notify the base station of the purpose of ranging through a ranging purpose indicator field included in the ranging request message by setting bits divided depending on the purpose of ranging. However, the ranging purpose indicator field is the parameter included in the ranging request message as described above, and is irrelevant to allocation of a resource for transmitting the ranging request message.

Accordingly, the base station needs to know the status of the mobile station or the purpose of ranging in advance to allocate an uplink resource for transmitting the ranging request message suitable for the purpose of ranging depending on the status of the mobile station. At this time, in case of ranging based on a dedicated ranging code or fast ranging, the base station already knows the purpose of ranging performed by the mobile station. However, in case of a ranging procedure of a contention based random access mode (that is, ranging based on a ranging code for handover), a problem occurs in that it is difficult for the base station to know the current status of the mobile station or the purpose of ranging in advance.

In order to solve the problem, according to one embodiment of the present invention, there is provided a method for transmitting divided handover ranging codes to a base station to perform a ranging procedure depending on a status of a mobile station.

Division of Ranging Codes

The mobile station may use ranging codes for normal handover by dividing the codes depending on its status or purpose of ranging, so as to notify the base station of its status or the purpose of ranging, whereby the base station can efficiently allocate a resource for transmitting a ranging request message to the mobile station.

In other words, a handover ranging code set is divided into subsets for active/sleep modes, idle mode location update, idle mode network re-entry and DCR mode, whereby the mode of the mobile station is identified through the ranging code included in each subset.

For example, if the number of codes in the handover ranging code set is 32, sub code sets for the mobile stations of the active/sleep modes may be used from code index 0 to code index 9, sub code sets for the mobile stations of the DCR mode may be used from code index 10 to code index 19, and sub code sets for the mobile stations of the idle mode may be used from code index 20 to code index 31. Under the assumption, if the base station receives the code index 4, it may identify that the mobile station, which has transmitted the code index 4, is in the active mode and intends to perform a ranging procedure for handover. Accordingly, the base station may know that it should allocate to the mobile station an uplink resource for transmission of parameters (for example, ranging purpose indicator) generally included in the ranging request message regardless of the purpose of ranging and parameters (for example, serving base station identifier) to be included in the ranging request message for the purpose of handover. At this time, if the base station can allocate a resource for transmission of the ranging request message suitable for the corresponding purpose, it allocates the resource to the mobile station.

This will be described with reference to FIG. 2.

Figure 2:
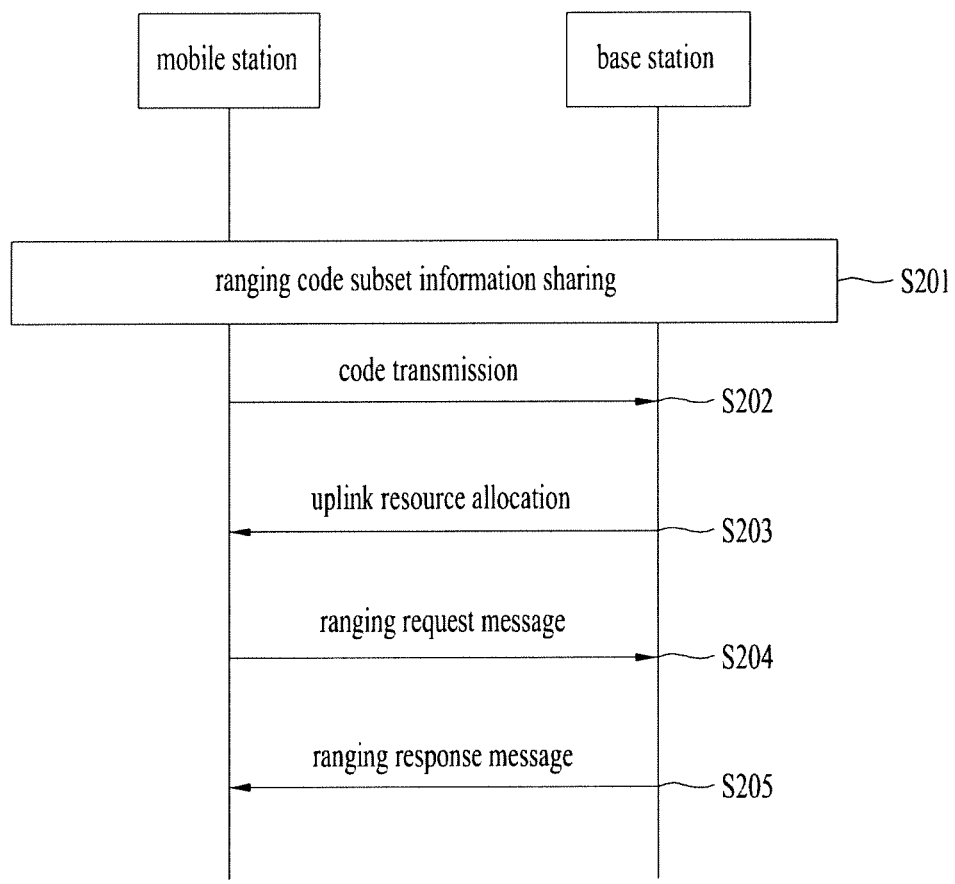
FIG. 2 is a diagram illustrating an example of a ranging procedure according to one embodiment of the present invention.

FIG. 2 is a diagram illustrating an example of a ranging procedure according to one embodiment of the present invention.

Referring to FIG. 2, ranging code subset information as to the handover ranging code set divided into subsets depending on the status of the mobile station may be shared between the mobile station and the base station (S201).

The ranging code subset information may be determined by a communication provider, and may be defined in advance and shared between the mobile station and the base station. Also, the ranging code subset information may be transmitted to the mobile station through a channel (for example, super frame header) multicast or broadcast by the base station. In this case, the ranging code subset information may be varied. If the base station notifies the mobile station of the ranging code subset information, a plurality of ranging code subset patterns may be defined in advance and may be notified to the mobile station in an index mode. Alternatively, the order of modes of the mobile station may be defined in advance and then the code index corresponding to the boundary of the ranging code subset corresponding to each mode may only be notified to the mobile station.

If the mobile station that has acquired the ranging code subset information is satisfied with a condition for performing ranging (for example, network re-entry or location update), it may select any one code from the ranging code subset corresponding to its status and transmit the selected code to the base station (S202).

The base station that has received the code from the mobile station may determine the status of the mobile station or the purpose of ranging by using the corresponding code, and may allocate an uplink resource for transmitting the ranging request message suitable for the determined status of the mobile station or purpose of ranging, to the mobile station (S203).

The mobile station may transmit the ranging request message (AAI_RNG-REQ) message to the base station through the uplink resource indicated by uplink resource allocation information (UL Alloc) received from the base station, wherein the ranging request message includes information suitable for the status of the mobile station or the purpose of ranging (S204).

The base station may transmit a ranging response message to the mobile station in response to the ranging request message transmitted from the mobile station (S205).

In the mean time, as illustrated in Table 6, if the mobile station performs location update in the idle mode and tries network re-entry in the same mode, the sizes of the resources occupied by each MCS level are the same as each other. Also, if the mobile station of the active/sleep modes tries ranging and the mobile station of the DCR mode performs network re-entry, the sizes of the resources occupied by each MCS level are the same as each other. Accordingly, the ranging code subset may not be divided into four depending on the aforementioned four statuses of the mobile station but be divided into two depending on the size of the resource required to transmit the ranging request message. In other words, the case where the mobile station performs location update in the idle mode and the case where the mobile station tries network re-entry in the idle mode are together set to one ranging code subset, and the mobile station of the active/sleep mode and the DCR mode may be set to another one ranging code subset. In this case, much more code indexes are allocated to one ranging code subset, whereby code collision may be reduced, which may occur as the mobile stations of one mode perform ranging at the same time.

Structure of Mobile Station and Base Station

Hereinafter, as another embodiment of the present invention, a mobile station (MS) and a femto base station (FBS, MBS) through which the embodiments of the present invention can be carried out will be described.

The mobile station is operated as a transmitting side in an uplink, whereas it is operated as a receiving side in a downlink. Also, the base station is operated as a receiving side in the uplink, whereas it is operated as a transmitting side in the downlink. In other words, each of the mobile station and the base station can include a transmitting side and a receiving side for transmission and reception of information or data.

The transmitting side and the receiving side can include a processor, a module, a part, and/or a means, for which the embodiments of the present invention are carried out. In particular, the transmitting side and the receiving side can include a module (means) for encoding messages, a module for decoding the encoded messages, and an antenna for transmitting and receiving messages. An example of the transmitting side and the receiving side will be described with reference to FIG. 3.

Figure 3:
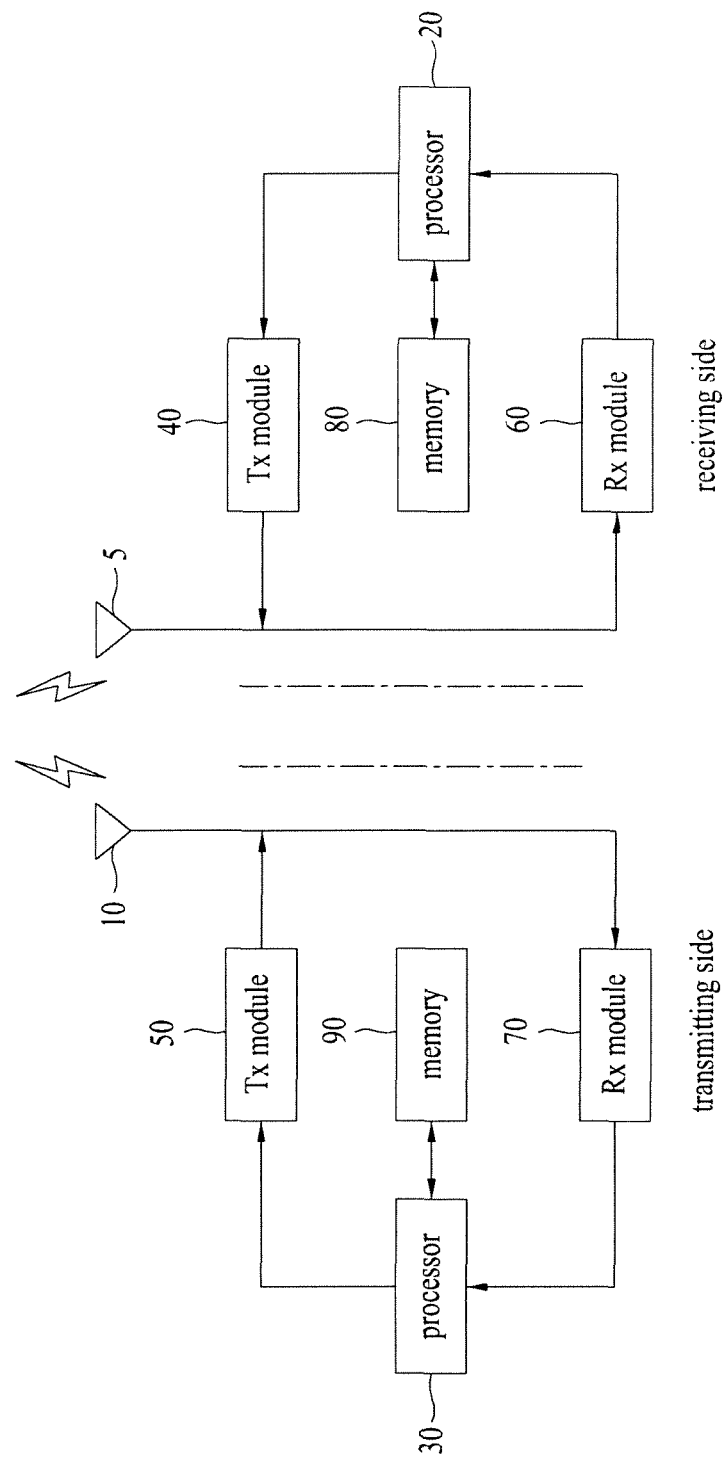
FIG. 3 is a block diagram illustrating an example of a transmitting side and a receiving side in accordance with another embodiment of the present invention.

FIG. 3 is a block diagram illustrating an example of a transmitting side and a receiving side in accordance with another embodiment of the present invention.

Referring to FIG. 3, the left side represents a structure of the transmitting side while the right side represents a structure of the receiving side. Each of the transmitting side and the receiving side may include an antenna 5, 10, a processor 20, 30, a Tx module 40, 50, an Rx module 60, 70, and a memory 80, 90. The respective elements can perform functions corresponding to those of counterparts. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70. If a MIMO function is supported, two or more antennas may be provided.

The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc. In more detail, the processor 20, 30 may perform the whole control operation for performing the aforementioned ranging procedure.

In particular, the processor of the mobile station may acquire ranging code subset information representing information as to a handover ranging code divided into subsets depending on the status of the mobile station and determine whether a condition for ranging is satisfied in a specific mode. If ranging is required, the processor may select one of ranging code subset corresponding to its status and transmit the selected code to a ranging region of the base station by controlling the RF module. Afterwards, if uplink resource allocation information corresponding to the code transmitted from the base station is allocated, the processor may transmit the ranging request message, which include information corresponding to its status or ranging purpose, to the base station.

In addition, the processor of the mobile station may perform the whole control operation of the steps disclosed in the aforementioned embodiments.

The Tx module 40, 50 may perform predetermined coding and modulation for data, which are scheduled from the processor 20, 30 and then transmitted to the outside, and then may transfer the coded and modulated data to the antenna 10.

The Rx module 60, 70 may perform decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (ranging code subset information, etc.). Also, the memory 80, 90 may include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the mean time, the base station may perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or may further include a separate means, module, or part for performing the aforementioned functions.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention can be applied to various wireless access systems. Examples of various wireless access systems include 3GPP (3rd generation partnership project), 3GPP2 and/or IEEE 802.xx (Institute of electrical and electronic engineers 802) system. The embodiments of the present invention can be applied to all the technical fields based on the various wireless access systems as well as the various wireless access systems.

The invention claimed is:

1. A method for allowing a mobile station to perform a contention based ranging in a broadband wireless access system, the method comprising:
    selecting a first ranging code subset or a second ranging code set that is different from the first ranging code subset among multiple ranging code subsets based on a purpose of the ranging and a mode of the mobile station, wherein the first ranging code subset is selected based on a first purpose of the ranging and a first mode of the mobile station, and the second ranging code subset is selected based on the first purpose of the ranging and a second mode of the mobile station;
    selecting any one code from one or more codes contained in the selected first or second ranging code subset; and
    transmitting the selected code to a base station,
    wherein said transmitting comprises:
        receiving uplink resource allocation information corresponding to the selected first or second ranging code subset including the transmitted code, from the base station; and
        transmitting a ranging request (AAI_RNG-REQ) message to the base station by using an uplink resource indicated by the uplink resource allocation information.

2. The method according to claim 1, wherein the purpose of the ranging includes handover, network re-entry, and location update, and wherein the mode of the mobile station includes an active mode, a sleep mode, an idle mode, and a deregistration with context retention (DCR) mode.

3. The method according to claim 2, wherein the handover and the network re-entry in the DCR mode correspond to the first ranging code subset, and the network re-entry in the idle mode and the location update in the idle mode correspond to the second ranging code subset.

4. The method according to claim 1, further comprising:
    receiving configuration information on the multiple ranging code subsets from the base station through a broadcast channel.

5. The method according to claim 1, wherein the multiple ranging code subsets are included in a handover ranging code set.

6. A method for allowing a base station to process a contention based ranging in a broadband wireless access system, the method comprising:
    receiving a handover ranging code from a mobile station;
    allocating an uplink resource to the mobile station, the uplink resource having a size corresponding to a ranging code subset including the received handover ranging code, wherein the ranging code subset, which is a first ranging code subset or a second ranging code subset that is different from the first ranging code subset, is selected among multiple ranging code subsets based on a purpose of the ranging and a mode of the mobile station, wherein the first ranging code subset is selected based on a first purpose of the ranging and a first mode of the mobile station, and the second ranging code subset is selected based on the first purpose of the ranging and a second mode of the mobile station;
    transmitting uplink resource allocation information indicating the allocated uplink resource to the mobile station; and
    receiving a ranging request (AAI_RNG-REQ) message from the mobile station through the uplink resource.

7. The method according to claim 6, wherein the purpose of the ranging includes handover, network re-entry, and location update, and wherein the mode of the mobile station includes an active mode, a sleep mode, an idle mode, and a deregistration with context retention (DCR) mode.

8. The method according to claim 7, wherein the handover and the network re-entry in the DCR mode correspond to the first ranging code subset, and the network re-entry in the idle mode and the location update in the idle mode correspond to the second ranging code subset.

9. The method according to claim 6, further comprising:
    broadcasting configuration information on the multiple ranging code subsets through a broadcast channel.

10. The method according to claim 6, wherein the multiple ranging code subsets are included in a handover ranging code set.

11. A mobile station operated in a broadband wireless access system, the mobile station comprising:
    a processor; and
    a radio frequency (RF) module transmitting and receiving a radio signal to and from the outside under the control of the processor,
    wherein the processor is configured to:
    select a first ranging code subset or a second ranging code subset that is different from the first ranging code subset among multiple ranging code subsets based on a purpose of a ranging and a mode of the mobile station, wherein the first ranging code subset is selected based on a first purpose of the ranging and a first mode of the mobile station, and the second ranging code subset is selected based on the first purpose of the ranging and a second mode of the mobile station;
    select any one code from one or more codes contained in the selected first or second ranging code subset; and
    cause the RF module to transmit the selected code to a base station,
    wherein if uplink resource allocation information corresponding to the selected first or second ranging code subset including the transmitted code is received from the base station, the processor is further configured to cause the RF module to transmit a ranging request (AAI_RNG-REQ) message to the base station by using an uplink resource indicated by the uplink resource allocation information.

12. The mobile station according to claim 11, wherein the purpose of ranging includes handover, network re-entry, and location update, and wherein the mode of the mobile station includes an active mode, a sleep mode, an idle mode, and a deregistration with context retention (DCR) mode.

13. The mobile station according to claim 11, wherein the handover and the network re-entry in the DCR mode correspond to the first ranging code subset, and the network re-entry in the idle mode and the location update in the idle mode correspond to the second ranging code subset.

14. The mobile station according to claim 11, wherein the processor is further configured to acquire configuration information on the multiple ranging code subsets from the base station through a broadcast channel.

15. The mobile station according to claim 11, wherein the multiple ranging code subsets are included in a handover ranging code set.

* * * * *